(12) United States Patent
Copeland

(10) Patent No.: US 7,137,653 B2
(45) Date of Patent: Nov. 21, 2006

(54) CENTROIDALLY TWISTABLE COMPRESSION RING FOR PIPE JOINTS

(75) Inventor: Daniel A. Copeland, Bessemer, AL (US)

(73) Assignee: United States Pipe and Foundry Company, LLC, Birmingham, AL (US)

( * ) Notice: Subject to any disclaimer, the term of this patent is extended or adjusted under 35 U.S.C. 154(b) by 173 days.

(21) Appl. No.: 10/950,263

(22) Filed: Sep. 24, 2004

(65) Prior Publication Data

US 2005/0067836 A1 Mar. 31, 2005

Related U.S. Application Data

(60) Provisional application No. 60/506,081, filed on Sep. 25, 2003.

(51) Int. Cl.
*F16L 37/00* (2006.01)

(52) U.S. Cl. .................. 285/321; 285/307; 285/340

(58) Field of Classification Search ............. 285/307, 285/340, 342, 343, 321, 306, 400
See application file for complete search history.

(56) References Cited

U.S. PATENT DOCUMENTS

| | | | |
|---|---|---|---|
| 784,400 | A | 3/1905 | Howe |
| 1,818,493 | A | 3/1931 | McWane |
| 1,930,194 | A | 10/1933 | Dillon |
| 2,201,372 | A | 5/1940 | Miller |
| 2,473,046 | A | 6/1949 | Adams |
| 2,491,004 | A | 12/1949 | Graham |
| 2,508,914 | A | 5/1950 | Graham |
| 2,953,398 | A | 9/1960 | Haugen |
| 3,400,950 | A | 9/1968 | Quebe et al. |
| 3,445,120 | A | 5/1969 | Barr |
| 3,582,112 | A | 6/1971 | Pico |
| 3,606,402 | A | 9/1971 | Medney |
| 3,724,880 | A | 4/1973 | Seiler |
| 3,726,549 | A | 4/1973 | Bradley |
| 3,731,955 | A | 5/1973 | Borsum et al. |
| 3,733,093 | A | 5/1973 | Seiler |
| 3,877,733 | A | 4/1975 | Straub |
| 3,963,298 | A | 6/1976 | Seiler |
| 4,119,333 | A | 10/1978 | Straub |
| 4,119,335 | A | 10/1978 | Rieffle |
| 4,229,026 | A | 10/1980 | Seiler |
| 4,396,210 | A | 8/1983 | Spencer, III |
| 4,428,604 | A | 1/1984 | Conner |
| 4,524,505 | A | 6/1985 | Conner |
| 4,540,204 | A | 9/1985 | Battle |
| 4,602,792 | A | 7/1986 | Andrick |
| 4,606,559 | A | 8/1986 | Rammelsberg |

(Continued)

FOREIGN PATENT DOCUMENTS

JP          5229625 A       3/1977

(Continued)

OTHER PUBLICATIONS

U.S. Appl. No. 09/590,586, filed Jun. 8, 2000, Holmes.

(Continued)

*Primary Examiner*—David Bochna
(74) *Attorney, Agent, or Firm*—Bradley Arant Rose & White

(57) ABSTRACT

A locking ring designed to work in a self restraining pipe joint. This locking ring is designed (which may include attention to a combination of shape and material properties) to twist when exposed to a concentrated load and thereby distribute this load across broader area of the pipe joint to increase the thrust restraining capabilities of the joint

2 Claims, 3 Drawing Sheets

U.S. PATENT DOCUMENTS

| | | |
|---|---|---|
| 4,643,466 A | 2/1987 | Conner et al. |
| 4,647,083 A | 3/1987 | Hashimoto |
| 4,660,866 A | 4/1987 | Jones |
| 4,662,656 A | 5/1987 | Douglas et al. |
| 4,664,426 A | 5/1987 | Ueki |
| 4,685,708 A | 8/1987 | Conner et al. |
| 4,789,167 A | 12/1988 | Housas |
| 4,805,932 A | 2/1989 | Imhof et al. |
| 4,848,805 A | 7/1989 | Bucher et al. |
| 4,867,488 A | 9/1989 | Jones |
| 4,878,698 A | 11/1989 | Gilchrist |
| 5,024,454 A | 6/1991 | McGilp |
| 5,037,144 A | 8/1991 | Peting |
| 5,058,907 A | 10/1991 | Percebois |
| 5,067,751 A | 11/1991 | Walworth et al. |
| 5,094,467 A | 3/1992 | Lagabe |
| 5,150,929 A | 9/1992 | Greatorex |
| 5,176,413 A | 1/1993 | Westman |
| 5,197,768 A | 3/1993 | Conner |
| 5,219,189 A | 6/1993 | Demoisson |
| 5,269,569 A | 12/1993 | Weber et al. |
| 5,295,697 A | 3/1994 | Weber et al. |
| 5,297,826 A | 3/1994 | Percebois |
| 5,328,215 A | 7/1994 | Grenier |
| 5,332,043 A | 7/1994 | Ferguson |
| 5,335,946 A | 8/1994 | Dent |
| 5,340,169 A | 8/1994 | Hoffman |
| 5,360,218 A | 11/1994 | Percebois |
| 5,398,980 A | 3/1995 | Hunter |
| 5,431,453 A | 7/1995 | Yamashita |
| 5,464,228 A | 11/1995 | Weber |
| 5,476,290 A | 12/1995 | Bergmann et al. |
| 5,476,292 A | 12/1995 | Harper |
| 5,496,073 A | 3/1996 | Grenier |
| 5,603,530 A | 2/1997 | Guest |
| 5,609,368 A | 3/1997 | Maki et al. |
| 5,645,285 A | 7/1997 | Percebois |
| D398,504 S | 9/1998 | Yamashita |
| 5,803,513 A | 9/1998 | Richardson |
| 5,897,146 A | 4/1999 | Saito et al. |
| 5,918,914 A | 7/1999 | Morris |
| 5,992,905 A | 11/1999 | Kennedy |
| 6,019,396 A | 2/2000 | Saito et al. |
| 6,062,611 A | 5/2000 | Percebois |
| 6,168,210 B1 | 1/2001 | Bird |
| 6,173,993 B1 | 1/2001 | Shumard |
| 6,220,635 B1 | 4/2001 | Vitel et al. |
| 6,299,217 B1 | 10/2001 | Saito et al. |
| 6,502,865 B1 | 1/2003 | Steele |
| 6,502,867 B1 | 1/2003 | Holmes |
| 6,568,658 B1 | 5/2003 | Strome |
| 6,688,652 B1 | 2/2004 | Holmes |
| 6,921,114 B1 | 7/2005 | Washburn et al. |
| 2002/0158466 A1 | 10/2002 | Jones |
| 2004/0075217 A1 | 4/2004 | Copeland |
| 2004/0155458 A1 | 8/2004 | Holmes |
| 2005/0006855 A1 | 1/2005 | Holmes |

FOREIGN PATENT DOCUMENTS

| | | |
|---|---|---|
| WO | WO 01/13023 | 2/2001 |
| WO | WO 03/050421 A2 | 6/2003 |
| WO | WO 2005/031174 A2 | 4/2005 |
| WO | WO 2005/047745 A2 | 5/2005 |

OTHER PUBLICATIONS

U.S. Appl. No. 10/685,914, filed Oct. 15, 2003, Copeland.
U.S. Appl. No. 10/774,544, filed Feb. 9, 2004, Holmes.
U.S. Appl. No. 10/841,197, filed May 7, 2004, Holmes.
PCT Search Report re PCT/US04/31595, Dec. 19, 2005, Copeland/U.S. Pipe.

CENTROIDALLY TWISTABLE COMPRESSION RING FOR PIPE JOINTS

This application claims the benefit of and priority to U.S. Provisional Application 60/506,081, filed Sep. 25, 2003.

FIELD OF INVENTION AND BASIC SUMMARY

A locking ring designed to work in a self restraining pipe joint. This locking ring is designed (which may include attention to a combination of shape and material properties) to deform when exposed to a concentrated load and thereby distribute this load across broader area of the pipe joint to increase the thrust restraining capabilities of the joint

BACKGROUND AND GENERAL

A current state of the art self restraining pipe joint is commonly known as the TR FLEX® Pipe joint as manufactured by U.S. Pipe and Foundry Co. Inc. This is described in U.S. Pat. No. 4,540,204 among others, which relies on individual locking segments engaging a weld bead on the spigot (male) end of one pipe with a cavity formed into the bell (female) end of the joining or mating pipe.

Several areas for improvement have been identified concerning the prior art involving this concept. The first is that the individual locking segments may not fully engage the weld bead placed on the spigot end of the pipe under all assembly conditions (including layout configurations and dimensional variations). These conditions may be so severe that the segments may, in fact, miss the weld bead entirely. This condition will greatly affect the thrust restraining capability of the joint. The second issue is that when the joint is deflected, the spigot approaches the bell at an angle instead of being concentric and parallel. This condition alters the longitudinal gap between the segment cavity (the bell groove) in the bell of one pipe and the weld bead on the spigot end of the other pipe. In short, the gap has a varying magnitude of separation. This gap is what is typically bridged by the individual locking segments. Only the locking segment(s) in the area of the smallest gap therefore will be engaged, creating a concentrated load on the bell and spigot of the mating pipe. The third issue is that assembly may be difficult in all but the most ideal circumstances since the individual locking segments must slide into the gap between the spigot and bell of mating pipes and this gap must be kept small in order to allow the segments to engage both halves of the pipe joint. The fourth issue is that the joint is sensitive to manufacturing tolerances. If the tolerances are allowed to vary too much, then the locking segments may not engage the spigot end of the mating pipe resulting in reduced joint performance.

OBJECTS OF THE INVENTION

The following stated objects of the invention are alternative and exemplary objects only, and no one or any should be read as required for the practice of the invention, or as an exhaustive listing of objects accomplished.

Improve the state of the art restrained joint performance over a wide variety of installation conditions, assembly conditions and manufacturing tolerances.

Make the joint easier and faster to assemble in a wide variety of assembly conditions and manufacturing tolerances.

Allow larger manufacturing tolerances to be used with no compromise in performance. The above objects and advantages are neither exhaustive nor individual critical to the spirit and practice of the invention, except as stated in the claims as issued. Other alternative objects and advantages of the present invention will become apparent to those skilled in the art from the following description of the invention.

SUMMARY OF THE INVENTION

A locking ring designed to work in a self restraining pipe joint. This locking ring is designed (which may include attention to a combination of shape and material properties) to twist when exposed to a concentrated load and thereby distribute this load across broader area of the pipe joint to increase the thrust restraining capabilities of the joint.

DETAILED DESCRIPTION OF THE INVENTION

The following is a detailed exemplary description of an embodiment of the invention, in a number of its various aspects. Those skilled in the art will understand that the specificity provided herein is intended for illustrative purposes with respect to an exemplary embodiment, only, and is not to be interpreted as limiting the scope of the invention or claims.

Figure 1:
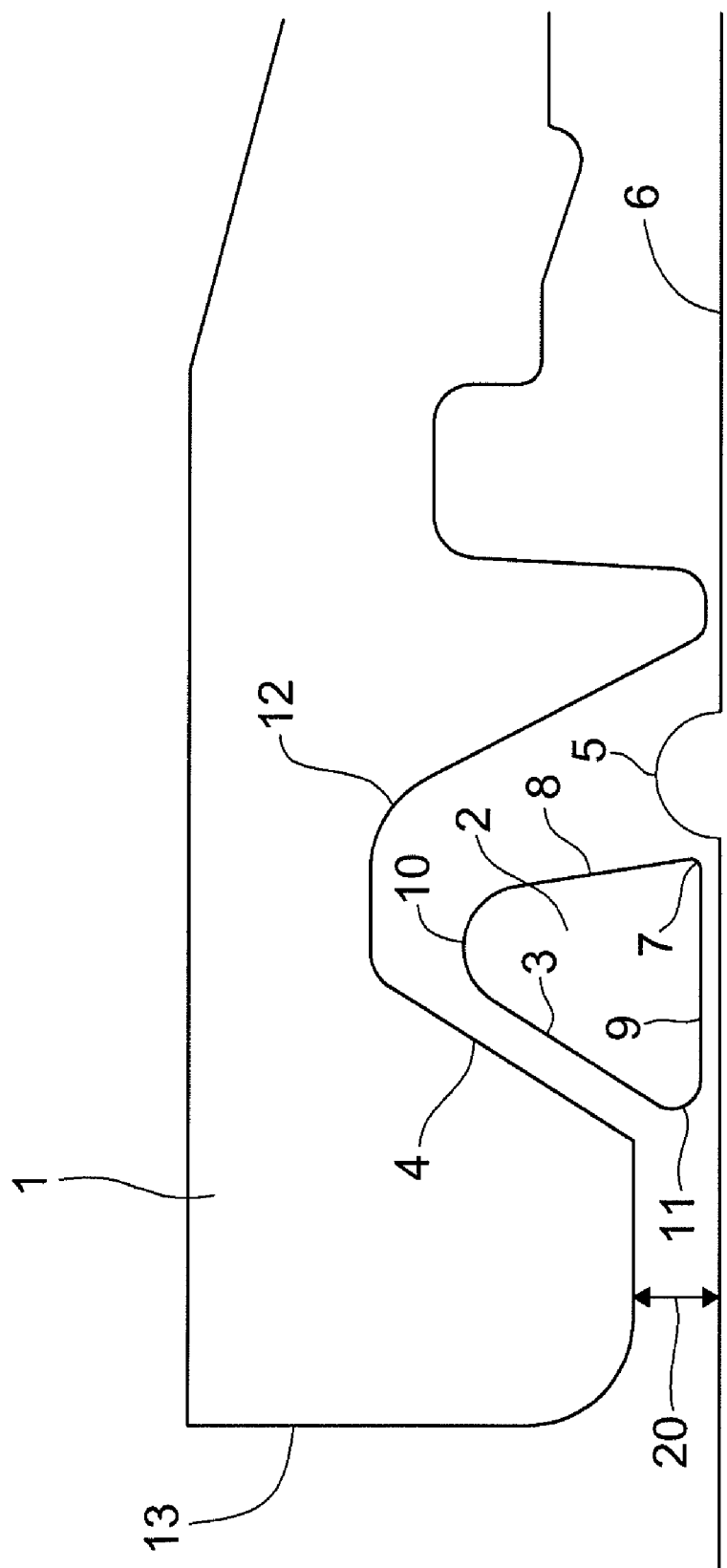
FIG. 1 shows a cut-away view of a portion of a pipe joint using an embodiment of a locking ring of the present invention, showing the locking ring in place between a pipe bell and pipe spigot the axes of which are aligned radially and angularly.
Figure 2:
FIG. 2 shows a cross section of an embodiment of a locking ring of the present invention.
Figure 3:
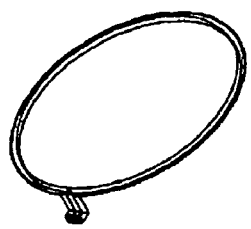
FIG. 3 shows an isometric view of an embodiment of a locking ring of the present invention.
Figure 4:
FIG. 4 shows a view of an embodiment of a locking ring of the present invention as seen looking along the plane of the ring, with the ears to the side.
Figure 5:
FIG. 5 shows a view of an embodiment of a locking ring of the present invention as seen looking along the plane of the ring, with the ears centered in the view to show a split.
Figure 6:
FIG. 6 shows a side view of an embodiment of ears on an embodiment of a locking ring of the present invention.
Figure 7:
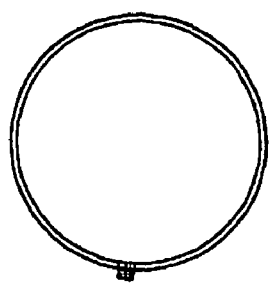
FIG. 7 shows a top-down view of an embodiment of a locking ring of a the present invention (i.e., seen as viewed from a position outside the plane of the locking ring).
Figure 8:
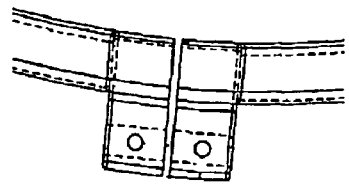
FIG. 8 shows a top-down view of an embodiment of ears on an embodiment of a locking ring of the present invention.

Turning to FIG. 1, a cross-sectional view of a joint of the present invention is shown, with the locking ring 2, a substantially ring-shaped body in place to prevent extraction of the pipe spigot 6 from the bell 1. In FIG. 1, the locking ring 2 is shown in a resting state (in the absence of forces exerted upon it in an angularly or radially displaced joint).

As is apparent from the depiction in FIG. 1, particularly to those of ordinary skill in the art, in the joint the pipe spigot 6 is partially disposed within the pipe bell 1 in such a manner that there is some annular gap 20 between the two, but locking ring 2 has a greater radial height than the annular gap 20. Accordingly, locking ring 2 cannot pass through the annular gap 2. The shown embodiments used by the inventors are pipes and bells of metal, specifically, ductile iron. Those in the art will understand that in normal assembly the locking ring 2 is inserted into the pipe bell 1, and disposed in the bell groove 12 prior to insertion of the pipe spigot 6 into the pipe bell 1. bell groove 12 may approximate the configuration of locking ring 2 as shown in FIG. 1, but in any event the size of the bell groove 12 is greater than the size of the locking ring 2, so as to allow some freedom of movement of the locking ring 2 within the confines of bell groove 12 (until the locking ring 2 is clamped in place or the joint is subjected to thrust loads). Because of this freedom of movement, the pipe spigot 6 can be inserted until at least the position shown in FIG. 1 by passing the weld bead 5 under the locking ring 2, such as occurs when locking ring 2 is held away from the pipe spigot 6 (e.g. by spring tension of the ring) or otherwise is not held firmly against pipe spigot 6. It will be appreciated from the drawing in FIG. 1 that the weld bead 5 is axially inward (to the right in the drawings) of bell thrust face 4. Sealing rings, such as gaskets, may be disposed at locations in the joint to provide fluid seal in addition to the restraint effected by the locking ring 2 of the present invention. By way of example, bell groove 12 in FIG. 1 is shown radially outward of (to the left of, in the drawings) such a sealing area.

As shown, pipe Bell 1 engages locking ring 2 via ring thrust face 3 and bell thrust face 4. These surfaces (thrust faces) are oriented, in the embodiment shown at FIG. 1, at approximately 30 degrees to a radial projecting from the centerline of the pipe bell. This mating angle determines the relationship of thrust load (restraint) to radial (locating) load. Restraint of the thrust load is the objective, but a minimal radial load is required to locate and retain the locking ring. The relationship of these two forces influences the overall restraint of the joint, and is addressed by the invention. The locking ring 2 is located between bell thrust face 4 and the weld bead 5. The locking ring is clamped to the outside surface of the pipe spigot 6 during assembly such that the inside corner 7 of the locking ring engages the weld bead 5, such engagement occurring at least when the pipe spigot 6 is drawn outward of the pipe bell 1. The load path is thus complete. Thrust is transferred from the pipe bell 1 to the locking ring 2 via the thrust faces (3 and 4) and then to the pipe spigot 6 via the inside corner 7 and weld bead 5 interface. After initial assembly, the action of the bell groove 12 around the locking ring 2 may render continued use of the clamping force unnecessary in some embodiments. As shown in the Figures, ring spigot face 9, and in fact locking ring 2, is not intended to bite into or cause deformation of the pipe spigot 6, as the resistance to movement is imparted by the weld bead 5. In the shown embodiments it is therefore devoid of teeth adapted to bite into pipe spigot 6.

Non-exhaustive examples of ways to clamp the locking ring 2 to the outside surface of pipe spigot 6 include use of a ring with a resting configuration having a smaller diameter than the pipe spigot 6 (which can be manually expanded to allow passage of the weld bead 5 thereunder) or use of calipers or other mechanisms to draw the split ends of the locking ring 2 together after weld bead 5 has passed by the locking ring 2 on its passage into the pipe bell 1. As shown in FIGS. 3 through 8, a particularly shown embodiment of the invention uses ears ("tabs") at the split ends of the locking ring 2, which tabs extend axially of the locking ring 2 (i.e., they are perpendicular to the plane of the locking ring 2). These tabs in the shown drawings are configured to extend outside of the pipe bell 1 even while locking ring 2 is within the bell groove 12, allowing them to be gripped, ratcheted together, bolted in place, or otherwise acted on in a way to draw the split ends of locking ring 2 together, or to press locking ring 2 into clamped association with the pipe spigot 2. In one configuration used by the inventors, the pipe bell 1 includes a slot or cut-out at some point along its outer face 13, which slot or cut-out is big enough to allow passage of the tabs therethrough. Alternatively, the tabs could be configured to pass through the annular gap 20 to become accessible outside of the pipe bell 1. As seen from the immediately preceding paragraph, when the locking ring 2 is clamped to the pipe spigot 6, either by way of a clamping force generated as discussed in this paragraph, or by the action of the pipe bell 1 around the locking ring 2, the locking ring 2 cannot slide outward of pipe bell 1 because it is greater in radial height than the height of annular gap 20, and weld bead 5 cannot slide past locking ring 2 because of its abutment with pipe spigot 6. As suggested in the preceding paragraph, and as would be understood from the drawing in FIG. 1, the abutment of locking ring 2 and pipe spigot 6 is further ensured (during movement of the pipe spigot 6 outward of pipe bell 1, which is movement of the pipe spigot 6 to the left in FIG. 1) by the fact that bell thrust face 4 and ring thrust face 3 meet at an angle which results in a "sliding wedge" action. In other words, for every unit of movement of locking ring 2 in an outward direction of the pipe bell 1 (i.e., to the left in FIG. 1), the locking ring 2 is also urged radially inwardly, which is toward more forced contact with the pipe spigot 6.

Figure 9:
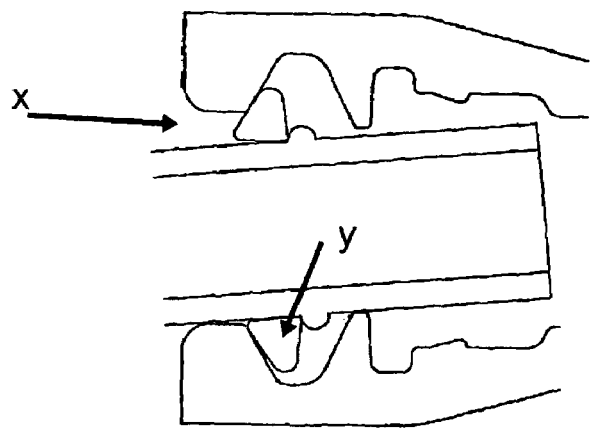
FIG. 9 shows a pipe joint incorporating an embodiment of a locking ring of the present invention, in which the axes of the pipe bell and the pipe spigot are angularly displaced from one another.
Figure 10:
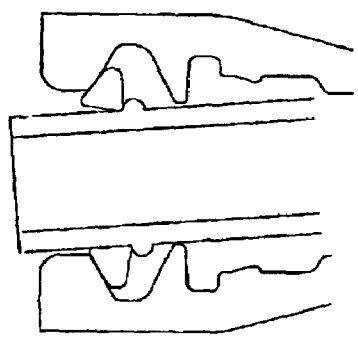
FIG. 10 shows another view as in FIG. 9, with stronger angular displacement.
Figure 11:
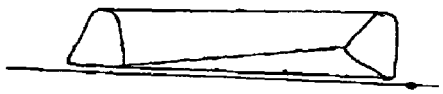
FIG. 11 shows a view of an embodiment of a locking ring of the present invention, demonstrating a twist occurring along the centroidal axis.

When the centerlines of the two halves of the mating joint (e.g. the pipe bell 1 and the pipe spigot 6) are concentric, and ignoring manufacturing imperfections, the thrust load is evenly distributed annularly around the mating surfaces of the locking ring 2. If the joint is deflected such that the centerline of one half of the joint (e.g. bell or spigot) is no longer concentric with the centerline of the other half of the joint (i.e. one centerline is offset by an angular or radial displacement), then the load is no longer evenly distributed annularly around the locking ring, but is concentrated in a specific region of the ring. This region of concentrated load is generally located at the closest longitudinal point between the bell thrust face 4 and the weld bead 5. Current state of the art restrained joints would suffer reduced performance (e.g. a reduced ability to withstand full thrust loads) due to this concentrated loading condition. In this invention, the one piece locking ring 2 distributes this concentrated load by twisting (deforming) about its centroidal axis. This twisting alters the apparent longitudinal length of the locking ring, and allows the locking ring to bridge a constantly varying gap between the bell thrust face 4 and the weld bead 5 Where the joint is not displaced, the locking ring 2, as shown in FIG. 1, does not twist. See, for example, FIG. 9, which shows a locking ring 2 in position in an angularly displaced joint. As shown in the FIG. 9, locking ring 2 is twisted about its centroidal axis (see that the ring spigot face 9 is essentially horizontal, or parallel to the bell axis, in the upper locations at location x and at the same time is at an angle essentially parallel to the axis of the Spigot 6, at location y, which can only occur if the locking ring 2 is twisting along its length). By way of example, the action of this twisting causes the ring to rotate about the centroidal axis at one location to a greater degree (or even in a different direction)

than at another location along the locking ring 2, such as would occur if a rubber ring stretched over a tube were held in place in one location, and were rolled along the surface of the tube at another location. FIG. 10 shows a more extremely deflected joint, also depicting twisting. FIG. 11 shows a cut-away of the locking ring 2, depicting the twisting by showing a cut-away of the locking Ring 2 resting on a flat surface, to exemplify the twisting that can occur. This ability of the locking ring to twist is affected by the shape of the cross section of the locking ring and the material properties of the ring.

In practice, in a deflected joint wherein the locking ring 2 has twisted, the ring spigot face 9 may enjoy a range of angular relationships to the pipe spigot 6. That is, varying angles may be presented between the ring spigot face 9 and the pipe spigot 6 along the ring's inner circumferential length. By way of example, it may be substantially flat (parallel) abutment to pipe spigot 6 at some locations, while the ring outside corner 11 or the inside corner 7 (or both at different locations) rise to varying degrees along the length.

In the shown embodiments, for instance, the cross sectional shape of the ring is generally a trapezoid (if ring top 10 is considered a "side"; otherwise, consistent with the drawing shown it could be considered a triangular cross section) with a horizontal bottom surface, a ring thrust face 3 of about 30 degrees (measured from the vertical), a ring back face 8 of about 10 degrees (measured from the vertical) and overall dimensions of approximately about 1 inch high by about 1 inch wide (as seen from the figures, the edges may be rounded, rather than coming to precise points). The material in the shown instance is 65-45-12 Ductile Iron. The weight for a ring as shown in the embodiment depicted in the drawings, assuming an inner diameter of 44.3 inches and ear length of 4.5 inches has been seen to be approximately 27.8 lbs. As shown from FIGS. 3, 4, 5, and 7, the locking ring 2 in its resting state is essentially flat along its plane (i.e., is not yet twisted, the twisting occurring, as discussed above, in response to radial or particularly angular displacement).

The ring thrust face 3 angle in the shown embodiment matches the angle of the bell thrust face 4, though precise matching is not required. This angle typically is between about 10 and about 45 degrees from a direct radial line (vertical) and is dependent on the desired ratio between thrust (longitudinal) load and radial load. Overall length and width of the cross section can be any desired value corresponding to the strength and stiffness desired. The back face can be any angle between 0 and 60 degrees depending on the desired stiffness (resistance to twist) and location of the centroid. The material may be any material of suitable ductility and resistance to bearing stress.

In some embodiments the invention allows the joint to maintain substantially its full thrust restraint rating over substantially the full range of assembly conditions (including layout configurations and dimensional variations) whereas joints of the prior art may exhibit reduced performance in some assembly conditions.

Likewise, in some embodiments, the invention allows quicker and easier assembly in the field over the prior art. Some embodiments of the invention may allow the use of larger manufacturing tolerances in the pipe bell without risk of losing contact with the mating pipe's weld bead. Some embodiments of the invention allow the potential reduction of manufacturing cost of the joint through reduced material requirements compared to rigid rings or individual segments.

The foregoing represents certain exemplary embodiments of the invention selected to teach the principles and practice of the invention generally to those in the art so that they may use their standard skill in the art to make these embodiments or other and variable embodiments of the claimed invention, based on industry skill, while remaining within the scope and practice of the invention, as well as the inventive teaching of this disclosure. The inventor stresses that the invention has numerous particular embodiments, the scope of which shall not be restricted further than the claims as issued. Unless otherwise specifically stated, applicant does not by consistent use of any term in the detailed description in connection with an illustrative embodiment intend to limit the meaning of that term to a particular meaning more narrow than that understood for the term generally. Moreover, stated advantages are exemplary and alternative, only, and should not be interpreted as required in all cases.

The figures shown are of illustrative embodiments, only. Notes, finishing, and measurements in such images are precise for such embodiments shown, but variation may be made as would be appreciable to one of ordinary skill in the art.

I claim:

1. A pipe joint comprising
   a. A first pipe comprising a pipe bell and a bell groove disposed annularly within the pipe bell, said bell groove being bounded on an axially outward side by a bell thrust surface,
   b. A second pipe comprising a pipe spigot and a weld bead located on the pipe spigot, said pipe spigot located partially within the pipe bell in a position in which the weld bead is further, by an axially measured distance, within the pipe bell than is the bell thrust surface, wherein the pipe spigot is radially separated from the pipe bell at a location around the pipe spigot periphery by an annular gap, and
   c. A locking ring being located between and in substantially continuous contact with the bell thrust surface and with the weld bead, which bell thrust surface and weld bead are separated by a gap having different measurements when measured at different locations in the pipe joint,
   in which the locking ring twists in response to angular displacement of an axis of the first pipe from an axis of the second pipe.

2. A pipe joint comprising
   a. A first pipe comprising a pipe bell and a bell groove disposed annularly within the pipe bell, said bell groove being bounded on an axially outward side by a bell thrust surface,
   b. A second pipe comprising a pipe spigot and a weld bead located on the pipe spigot, said pipe spigot located partially within the pipe bell in a position in which the weld bead is further, by an axially measured distance, within the pipe bell than is the bell thrust surface, wherein the pipe spigot is radially separated from the pipe bell at a location around the pipe spigot periphery by an annular gap, and
   c. A locking ring being located between and in substantially continuous contact with the bell thrust surface and with the weld bead, which bell thrust surface and weld bead are separated by a gap having different measurements when measured at different locations in the pipe joint,
   in which the locking ring twists in response to radial displacement of an axis of the first pipe from an axis of the second pipe.

* * * * *